United States Patent Office 3,739,002
Patented June 12, 1973

3,739,002
CEPHALOSPORIN C SOLUBILIZATION PROCESS
Harold B. Hayes and Gerald L. Huff, Indianapolis, Ind., assignors to Eli Lilly and Company, Indianapolis, Ind.
No Drawing. Continuation-in-part of application Ser. No. 836,953, June 26, 1969. This application Dec. 17, 1969, Ser. No. 886,030
The portion of the term of the patent subsequent to Feb. 8, 1989, has been disclaimed
Int. Cl. C07d 99/24
U.S. Cl. 260—243 C        6 Claims

ABSTRACT OF THE DISCLOSURE

Acylation of the side-chain amino group of cephalosporin C with a halo lower alkanoyl group leads to a solvent-soluble product which can be efficiently extracted from the aqueous fermentation broth by use of an organic solvent.

CROSS REFERENCE

This application is a continuation-in-part of our copending application Ser. No. 836,953, filed June 26, 1969, now Pat. No. 3,641,018.

BACKGROUND OF THE INVENTION

Cephalosporin C is a fermentation-derived product which has a low order of biological activity but which is the starting material for the preparation of a number of antibiotics that are widely used in the treatment of disease. Cephalosporin C is soluble in the aqueous fermentation broth but is insoluble in organic solvents so that heretofore its isolation from the broth has been difficult and inefficient.

Attempts to prepare N-alkanoyl derivatives of cephalosporin C by acylation of the amino group in the adipoyl side-chain have been unsuccessful. In many instances none of the desired N-alkanoyl compound has been obtained, and at best, yields have been so low as to be impractical. For example, no N-acetylcephalosporin C is obtained using acetyl chloride as the acylating agent and only a five percent yield was obtained using acetic anhydride.

SUMMARY

We have now discovered a method for converting cephalosporin C to an organic solvent-soluble derivative in good yield which comprises acylating the amino group in the adipoyl side-chain of cephalosporin C with an $\alpha$ halo or $\alpha,\alpha$-dihalo $C_2$–$C_4$ alkanoyl group. It is surprising that the presence of an $\alpha$-halogen so dramatically changes the yield as to make the process a practical one for obtaining a solvent-soluble derivative. This acylation step may be conducted in the aqueous fermentation broth and the N-acylated product may be extracted from the aqueous broth by the use of a water immiscible organic solvent. 7-aminocephalosporanic acid can be obtained from this N-acylated cephalosporin C by any convenient side-chain cleavage reaction such as treatment with phosphorous pentachloride to obtain an imino chloride, followed by conversion of the imino chloride to an imino ether by reaction with a lower alkanol, and hydrolysis of the imino ether to 7-aminocephalosporanic acid.

DESCRIPTION OF THE PREFERRED EMBODIMENT

In accordance with our process cephalosporin C is converted to an organic solvent-soluble derivative by acylating the amino group in the adipoyl side-chain with an $\alpha$-halo or $\alpha,\alpha$-dihalo $C_2$–$C_4$ alkanoyl group. This solvent soluble derivative can then be easily and efficiently recovered from the aqueous fermentation broth by extraction with an organic solvent.

These halo lower alkanoyl groups are not readily removed from the amino group; however, this is really immaterial since cephalosporin C itself has no useful biological activity but is important primarily as a starting material for the preparation of a number of widely-used antibiotic materials, including cephaloridine and cephlothin. The first step in converting the cephalosporin C to these useful antibiotics is the removal of the aminoadipoyl side-chain and the presence of the halo lower alkanoyl group does not interfere with this side-chain cleavage reaction.

The solubilizing halo lower alkanoyl group employed by us is one derived from a $C_2$–$C_4$ carboxylic acid having one or two halogen atoms on the $\alpha$-carbon atom. The preferred halogen atom is chlorine but other halogens such as bromine and fluorine can also be used. Examples of suitable solubilizing groups include chloroacetyl, dichloroacetyl, bromoacetyl, fluoroacetyl, $\alpha$-chloropropionyl, $\alpha,\alpha$-dichloropropionyl, $\alpha$-chlorobutyryl and $\alpha$-chloro-$\alpha$-methyl propionyl. The chloroacetyl group is preferred.

Usual acylation procedures known to those skilled in the art are used in placing the solubilizing group on the side-chain amino group of cephalosporin C. The acylation may be conducted using a haloalkanoyl halide or an anhydride of the halo acid. We have had particularly good results using a haloalkanoyl chloride such as chloroacetyl chloride. Surprisingly, the use of a mixed anhydride of chloroacetic acid such as acetic chloroacetic anhydride gives almost exclusively the N-chloroacetyl cephalosporin C.

The primary purpose in converting cephalosporin C to an organic solvent-soluble derivative is to aid in the isolation of cephalosporin C from the fermentation broth. To achieve this end it is necessary that the acylation reaction be conducted in the fermentation broth. This can be readily accomplished. The broth is preferably filtered prior to the acylation step and may also be concentrated to avoid handling large volumes of water.

This N-haloalkanoylcephalosporin C may now be extracted from the fermentation broth with a water immiscible organic solvent. By water immiscible we mean a solvent having limited solubility in water and not necessarily one completely insoluble. For example, ethyl acetate, which is slightly soluble in water, is an excellent solvent for this extraction. The extraction is preferably conducted at an acid pH.

Organic solvents that may be used in the extraction step include lower esters such as ethyl acetate, n-propyl acetate, isopropyl acetate, and sec.-butyl acetate. It is sometimes advantageous to mix the ester with from one-tenth to one volume of a lower alkanol such as ethyl alcohol or n-butyl alcohol. Other suitable solvents include nitriles such as butyronitrile and adiponitrile and ketones such as cyclohexanone and methyl isobutyl ketone. The preferred solvents are ethyl acetate, butyronitrile and cyclohexanone.

The N-haloalkanoylcephalosporin C can be separated from the organic solvent by any well known procedure. For example, the solution may be made basic to prepare a salt of the cephalosporin C derivative which precipitates from the organic solvent upon stirring, preferably with cooling of the solution. This isolated derivative may then be subjected to a side chain cleavage reaction to obtain 7-aminocephalosporanic acid. It may also be possible to conduct the cleavage reaction in the organic solvent used for the extraction so that isolation of the N-haloalkanoylcephalosporin C is not necessary.

The following examples will illustrate the preparation of our soluble cephalosporin C derivatives and their extraction from the aqueous fermentation broth. Two methods of analysis of cephalosporin C activity were used in this work. The first is an ultraviolet method which detects not only cephalosporin C but other related materials which will react with the acylating reagent. The second method is a nicotinamide method which is more specific for cephalosporin C and the results of this method are used in calculating yields.

EXAMPLE 1

One liter of cephalosporin C fermentation broth which had been filtered and treated with ion exchange resin was found by ultraviolet analysis to contain 89 g. of cephalosporin C-like material and by nicotinamide analysis was found to contain 75.25 g. of cephalosporin C. To this liter of fermentation broth were added 1 l. of saturated sodium bicarbonate solution containing 25 ml. of 25 percent sodium hydroxide solution and 500 ml. of acetone. Over a fifteen minute period there was added 500 ml. of a solution of 72 ml. of chloroacetyl chloride in acetone. During this addition period the pH was maintained between 8.0 and 8.7 and the reaction was kept in an ice bath to hold the temperature within the range of 20° to 28° C. The reaction mixture was stirred an additional 15 minutes after addition was completed. The total volume of the reaction mixture was 3070 ml.

To 1520 ml. of this original reaction mixture was added 300 ml. of benzene and the pH of the mixture was adjusted to 3.5 by the addition of 135 ml. of 6 N hydrochloric acid. The phases were allowed to separate and the benzene was discarded leaving 1220 ml. of aqueous solution. This 1220 ml. was divided into two equal portions which shall be referred to as solutions A1 and A2.

To solution A1 was added an equal volume of ethyl acetate and the pH was adjusted to 2.0 by the addition of 6 N hydrochloric acid. The phases were separated and a second equal volume extraction with ethyl acetate was performed. The combined ethyl acetate extracts were dried over sodium sulfate leaving 1200 ml. of ethyl acetate solution which by ultraviolet analysis contained 11.5 g. of activity. To the ethyl acetate solution was added 16.6 ml. of quinoline and the mixture was seeded. The mixture was stirred overnight at room temperature and was then chilled before filtration. The solid product was washed with 25 ml. of acetone and dried in a vacuum oven to yield 18.9 g. of the quinoline salt of N-chloroacetylcephalosporin C.

To solution A2 were added 200 ml. of acetone and 810 ml. of ethyl acetate. The pH was adjusted to 2.0 with 6 N hydrochloric acid and the phases were allowed to separate. The ethyl acetate was dried over sodium sulfate to yield 1080 ml. of ethyl acetate extract which was shown by ultraviolet analysis to contain 12.9 g. of activity. To this solution was added 18.6 ml. of quinoline and the mixture was seeded. The mixture was stirred overnight and chilled before filtering off the solids. The solid product was washed with acetone and dried in a vacuum oven to yield 17.8 g. of the quinoline salt of N-chloroacetylcephalosporin C.

Another 1520 ml. of the original reaction mixture was treated with an equal volume of ethyl acetate and the pH was adjusted to 2.0 by the addition of 235 ml. of 6 N hydrochloric acid and the phases were separated. A second extraction with an equal volume of ethyl acetate was performed. The combined ethyl acetate extracts had a volume of 3000 ml. and ultraviolet analysis showed it to contain 30.9 g. of activity.

EXAMPLE 2

To 1 l. of resin-treated cephalosporin C fermentation broth containing 32.5 g. of activity by ultraviolet analysis and 26.15 g. by nicotinamide analysis were added 300 ml. of acetone and 100 g. of dry sodium bicarbonate while the mixture was held in a 10° C. ice bath. The pH was adjusted to 8.5 by the addition of 25 percent sodium hydroxide solution. While cooling was continued, a solution of 45 ml. of dichloroacetyl chloride in 255 ml. of acetone was added to the reaction mixture over a 15 minute period. During the addition the pH was maintained at 8.0 to 8.8 by addition of 25 percent sodium hydroxide solution. Upon completion of the addition the mixture was removed from the ice bath and stirred at 20° C. for 20 minutes. The pH was then adjusted to 3.5 with 6 N hydrochloric acid and 1700 ml. of ethyl acetate was added for extraction while the pH was further adjusted with 6 N hydrochloric acid to 1.9. This mixture was stirred for 15 minutes and centrifuged for separation. The ethyl acetate phase had a volume of 1940 ml. and ultraviolet analysis showed 12.8 g. of activity. To the ethyl acetate extract was added 41 ml. of quinoline in two approximately equal portions and the mixture was seeded. After standing in the refrigerator over the weekend the mixture was filtered. The solids washed with acetone and dried at 35° C. in a vacuum oven to yield 20.6 g. of the quinoline salt of N-dichloroacetylcephalosporin C.

EXAMPLE 3

The procedure of Example 2 was repeated replacing the dichloroacetyl chloride with 2-chloropropionyl chloride. The temperature rose to 40° C. during the addition and the pH was difficult to control, varying between 7.5 and 9.3. The product from the reaction was the quinoline salt of N-(2-chloropropionyl)-cephalosporin C.

EXAMPLE 4

Following the procedure of Example 2 using 4400 ml. of fermentation broth containing 145 g. of activity by ultraviolet analysis and 133 ml. of chloroacetyl chloride there was obtained 11,800 ml. of ethyl acetate extract containing 123.4 g. of N-chloroacetylcephalosporin C.

EXAMPLE 5

Four liters of filtered fermentation broth having a pH of 4.4 containing 5.77 mg. of cephalosporin C per milliliter by nicotinamide analysis was chilled in an ice bath. To this cold broth were added 20 g. of sodium borate decahydrate and 1200 ml. of acetone. The pH of this mixture was adjusted to 8.5 by the addition of 25 percent sodium hydroxide solution. To the chilled mixture was slowly added a solution of 74 ml. of chloroacetyl chloride in 600 ml. of acetone while the pH was maintained at 8.5. After addition was complete the mixture was stirred another 30 minutes maintaining the pH at 8.5. The pH was lowered to 4.5 by the addition of 25 percent sulfuric acid, 6800 ml. of ethyl acetate was added and the pH was lowered to 2.0 by the addition of more sulfuric acid. After stirring for 15 minutes an emulsion had formed and the phases would not separate. To the emulsion were added 200 ml. of acetone and 150 ml. of a commercial demulsifier. The phases were separated and a second ethyl acetate extraction of the aqueous phase was made using 1 l. of ethyl acetate. The combined ethyl acetate phases had a total volume of 9.6 l. This was concentrated to 4.5 l. and divided into two beakers. To each beaker was added 70 l. of quinoline and the mixture was stirred overnight. Crystals formed in one beaker while an oil had separated in the other. The supernatent liquid was decanted from the oil and seeded. The solution was then concentrated until solids started to form. The mixture was combined with the half that had previously had crystal formation. The mixture was stirred and chilled for one hour, then filtered. The solid quinoline salt of N-chloroacetylcephalosporin C was washed with a small amount of acetone and dried in a 40° C. vacuum oven to yield 15.3 g.

EXAMPLE 6

Ten liters of filtered fermentation broth was adjusted to pH 6.2 and concentrated in a flash evaporator to 1.8 l. Ultraviolet analysis showed this concentrated broth to contain 46.5 g. of cephalosporin C activity per liter. The concentrated filtered broth was chilled in an ice bath and 18 g. of sodium borate decahydrate and 540 ml. of acetone were added. The pH was adjusted to 8.5 with 25 percent sodium hydroxide solution. A solution of 56.5 ml. of chloroacetyl chloride in 4085 ml. of acetone was slowly added while the pH was maintained at 8.5 to 9.0 by the addition of 25 percent sodium hydroxide solution. The mixture was stirred 15 minutes after the addition was complete. To the mixture was added 1530 ml. of ethyl acetate, the pH was adjusted to 2.0 with 25 percent sulfuric acid. The mixture was stirred 15 minutes and the phases were separated by centrifugation. A second extraction with 1500 ml. of ethyl acetate was made and the two ethyl acetate extracts were combined for a total volume of 3825 ml. The combined extracts were concentrated to 750 ml. and 1 l. of ethyl acetate saturated with water was added. Quinoline (100 ml.) was added, the mixture cooled in the refrigerator, filtered, and the solid washed with 200 ml. of acetone and dried at 40° C. in a vacuum oven overnight to yield 51.8 g. of the quinoline salt of N-chloroacetylcephalosporin C.

EXAMPLE 7

The pH of a solution of 4.6 g. of the sodium salt of cephalosporin C having an 89 percent purity in 30 ml. of water was adjusted to 9.0 by the addition of 20 percent sodium hydroxide solution. A solution of 1.3 ml. of chloroacetyl chloride in 8.7 ml. of acetone was added dropwise while the pH was maintained at 8.0 to 9.3 by the addition of 10 percent sodium hydroxide. The addition required approximately 15 minutes and the mixture was stirred an additional five minutes. The pH was then adjusted to 6.5 with 6 N hydrochloric acid, 80 ml. of ethyl acetate was added, and the pH was lowered to 2.0 with 6 N hydrochloric acid. After stirring for five minutes, the phases were separated and the ethyl acetate phase dried over sodium sulfate. A saturated methanolic solution of sodium acetate was added to a pH of 7.2 which rose to 7.7 on stirring. The white solid which separated was filtered, cooled and dried in a desiccator overnight to yield 2.5 g. of the sodium salt of N-chloroacetylcephalosporin C.

Our organic solvent-soluble derivatives of cephalosporin C have the formula

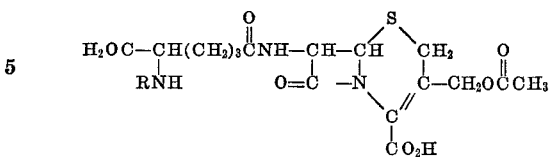

wherein R is an α-halo or α,α-dihalo $C_2$–$C_4$ alkanoyl group. The preferred halogen is chlorine and the preferred haloalkanoyl group is chloroacetyl.

In addition to obtaining the free acids as depicted in the above formula, we have also obtained these derivatives in the form of salts. These salts may be the alkali metal, alkaline earth metal, or amine salts of the carboxylic acids. Typical amines that have been used for salt formation are quinoline, cyclohexylamine, 5-ethyl-2-methylpyridine, 2-picoline, 3-picoline, 4-picoline, N-ethylmorpholine, N-methylmorpholine, 2,6-lutidine, N,N-diethylcyclohexylamine, hexamethylenetetramine, N,N-dimethylbenzylamine, or N,N'-dibenzylethylenediamine.

We claim:
1. A method for converting cephalosporin C to an organic solvent-soluble derivative which comprises acylating the amino group in the adipoyl side-chain of cephalosporin C with an α-halo or α,α-dihalo $C_2$–$C_4$ alkanoyl group.
2. A method as in claim 1 wherein the halogen is chlorine.
3. A method as in claim 2 wherein the alkanoyl group is chloroacetyl.
4. A method as in claim 1 wherein the acylation is carried out in the aqueous fermentation broth.
5. A method in claim 4 wherein the halogen is chlorine.
6. A method as in claim 5 wherein the alkanoyl group is chloroacetyl.

References Cited
UNITED STATES PATENTS 3,160,631   12/1964   Peterson et al. ____ 260—243 C
3,234,222   2/1966   Fechtig et al. _____ 260—243 C NICHOLAS S. RIZZO, Primary Examiner